(12) United States Patent
Gao et al.

(10) Patent No.: US 11,886,202 B2
(45) Date of Patent: Jan. 30, 2024

(54) METHOD AND SYSTEM FOR SWITCHING BETWEEN LOCAL AND REMOTE GUIDANCE INSTRUCTIONS FOR AUTONOMOUS VEHICLES

(71) Applicant: Argo AI, LLC, Pittsburgh, PA (US)

(72) Inventors: Shenglong Gao, Sunnyvale, CA (US); Ruben Zhao, San Mateo, CA (US); Marcial Hernandez, Pittsburgh, PA (US); Thomas Petroff, Gibsonia, PA (US); Edward Venator, Pittsburgh, PA (US)

(73) Assignee: Argo AI, LLC, Pittsburgh, PA (US)

( * ) Notice: Subject to any disclaimer, the term of this patent is extended or adjusted under 35 U.S.C. 154(b) by 13 days.

(21) Appl. No.: 17/508,457

(22) Filed: Oct. 22, 2021

(65) Prior Publication Data
US 2023/0132029 A1 Apr. 27, 2023

(51) Int. Cl.
*G05D 1/02* (2020.01)
*B60W 60/00* (2020.01)

(52) U.S. Cl.
CPC ......... *G05D 1/0276* (2013.01); *B60W 60/001* (2020.02); *B60W 2554/801* (2020.02);
(Continued)

(58) Field of Classification Search
CPC .............. G05D 1/0276; B60W 60/001; B60W 2554/801; B60W 2554/802; B60W 2556/45; B60W 2720/10; B60W 2720/12
See application file for complete search history.

(56) References Cited

U.S. PATENT DOCUMENTS

| 10,564,638 B1 | 2/2020 | Lockwood et al. |
| 2018/0224850 A1 | 8/2018 | Kroop et al. |

(Continued)

FOREIGN PATENT DOCUMENTS

WO 2019165135 A1 8/2019

OTHER PUBLICATIONS

Gonzalez, D. et al., A Review of Motion Planning Techniques for Automated Vehicles, IEEE Transactions on Intelligent Transportation Systems, Nov. 2015.

(Continued)

*Primary Examiner* — Rodney A Butler
(74) *Attorney, Agent, or Firm* — Fox Rothschild LLP

(57) ABSTRACT

Disclosed herein are system, method, and computer program product embodiments for switching between local and remote guidance instructions for autonomous vehicles. For example, the method includes, in response to monitoring one or more actions of objects detected in a scene in which the autonomous robotic system is moving, causing the autonomous robotic system to slow or cease movement in the scene. The method includes detecting a trigger condition based on movement of the autonomous robotic system in the scene. In response to the one or more monitored actions and detecting the trigger condition, the method includes transmitting a remote guidance request to a remote server. After transmitting the remote guidance request, the method includes receiving remote guidance instructions from the remote server and causing the autonomous robotic system to begin operating according to the remote guidance instructions.

18 Claims, 9 Drawing Sheets

(52) U.S. Cl.
CPC ... *B60W 2554/802* (2020.02); *B60W 2556/45* (2020.02); *B60W 2720/10* (2013.01); *B60W 2720/12* (2013.01)

(56) References Cited

U.S. PATENT DOCUMENTS

| | | | |
|---|---|---|---|
| 2019/0056729 A1* | 2/2019 | Ferguson | G06K 7/10297 |
| 2020/0262444 A1 | 8/2020 | Kong et al. | |
| 2020/0409363 A1* | 12/2020 | Gogna | G05D 1/0276 |
| 2021/0072744 A1* | 3/2021 | Urano | G05D 1/0011 |
| 2021/0323573 A1* | 10/2021 | Gogna | B60W 40/10 |
| 2022/0121837 A1* | 4/2022 | Cesic | G06V 20/50 |

OTHER PUBLICATIONS

Yurtsever, E. et al., A Survey of Automonous Driving: Common Practices and Emerging Technologies, IEEE Access, Vo. 8, Apr. 2020.

Mutzenich, C. et al., Updating our understanding of situation awareness in relation to remote operators of autonomous vehicles, Cogn. Research, 6:9, 2021.

Alishev Neil et al: "Network Failure Detection and Autonomous Return Algorithms for a Crawler Mobile Robot Navigation", 2018 11th International Conference On Developments in Esystems Engineering (DESE), IEEE, Sep. 2, 2018.

Extended European Search Report for European Patent Application No. 22202216.2 dated Feb. 22, 2023, 13 pages.

* cited by examiner

METHOD AND SYSTEM FOR SWITCHING BETWEEN LOCAL AND REMOTE GUIDANCE INSTRUCTIONS FOR AUTONOMOUS VEHICLES

BACKGROUND

Autonomous vehicles (AVs) offer a range of potential benefits to society and to individuals such as mobility solutions for those who cannot drive themselves in the form of ride-sharing or autonomous taxi services, and reducing the number of road collisions that stem from errors in human judgement. AVs also provide plausible solutions to the issue of overcrowded highways as connected cars will communicate with each other and navigate an effective route based on real-time traffic information, making better use of road space by spreading demand. However, unpredictable, novel occurrences which fall outside the parameters of the AVs' programming or training can prompt the AV to cease forward progress until the occurrence is resolved. These "edge cases" include a wide range of unexpected situations that arise in the real world. Recognizing when an "edge case" has occurred and effectively addressing it to permit continued careful forward progress is advantageous.

This document describes methods and systems that are directed to addressing the problems described above, and/or other issues.

SUMMARY

The present disclosure describes embodiments related to guiding an autonomous robotic system. In an embodiment, a method of guiding an autonomous robotic system includes, in response to monitoring one or more actions of one or more objects detected in a scene in which the autonomous robotic system is moving, causing the autonomous robotic system to slow or cease movement of the autonomous robotic system in the scene. The method further includes detecting a trigger condition based on movement of the autonomous robotic system in the scene. In response to the one or more monitored actions and detecting the trigger condition, the method includes transmitting a remote guidance request to a remote server. After transmitting the remote guidance request, the method includes receiving remote guidance instructions from the remote server and causing the autonomous robotic system to begin operating according to the remote guidance instructions.

Implementations of the disclosure may include one or more of the following optional features. The method may include transmitting perception data to the remote server while operating according to the remote guidance instructions In some examples, operating according to the remote guidance instructions includes reducing a minimum allowable buffer size within which the autonomous robotic system may approach one or more of the objects, reducing a maximum allowable speed of the autonomous robotic system, causing the autonomous robotic system to move in the scene according to the minimum allowable buffer size and the maximum allowable speed and, after at least a threshold amount of time or distance, reverting the minimum allowable buffer size and the maximum allowable speed to previous values. Reducing the minimum allowable buffer size may include reducing the minimum allowable buffer size by approximately 50%. In some examples, the minimum allowable buffer size includes a first distance from the autonomous robotic system in one direction relative to an orientation of the autonomous robotic system and a second distance from the autonomous robotic system in another direction relative to the orientation of the autonomous robotic system, wherein the first distance and the second distance are different. Either the first distance or the second distance may be in a vertical direction above the autonomous robotic system.

In some examples, the method includes detecting the trigger condition after the autonomous robotic system has slowed or ceased its movement in the scene. In some examples, the trigger condition includes a state in which the autonomous robotic system has stopped for more than a threshold period of time and in which the monitored action was not an action or state of a traffic control device. The method may further include, in response to losing communication with the remote server, causing the autonomous robotic system to cease operating according to the remote guidance instructions. The method may further include, in response to receiving instructions from the remote server to cease operating according to the remote guidance instructions, causing the autonomous robotic system to cease operating according to the remote guidance instructions. In some examples, the method further includes, in response to operating according to the remote guidance instructions for a threshold period of time, causing the autonomous robotic system to cease operating according to the remote guidance instructions.

In an embodiment, an autonomous robotic system includes a memory that stores programming instructions that are configured to cause a processor to guide the autonomous robotic system by, in response to monitoring one or more actions of one or more objects detected in a scene in which the autonomous robotic system is moving, causing the autonomous robotic system to slow or cease movement of the autonomous robotic system in the scene. The system detects a trigger condition based on movement of the autonomous robotic system in the scene and, in response to the one or more monitored actions and detecting the trigger condition, the system transmits a remote guidance request to a remote server. After transmitting the remote guidance request, the system receives remote guidance instructions from the remote server and causes the autonomous robotic system to begin operating according to the remote guidance instructions.

Implementations of the disclosure may include one or more of the following optional features. The system may transmit perception data to the remote server while operating according to the remote guidance instructions. In some examples, the programming instructions are further configured to cause the processor to guide the autonomous robotic system by reducing a minimum allowable buffer size within which the autonomous robotic system may approach one or more of the objects, reducing a maximum allowable speed of the autonomous robotic system, causing the autonomous robotic system to move in the scene according to the minimum allowable buffer size and the maximum allowable speed and, after at least a threshold amount of time or distance, reverting the minimum allowable buffer size and the maximum allowable speed to previous values. Reducing the minimum allowable buffer size may include reducing the minimum allowable buffer size by approximately 50%. In some examples, the minimum allowable buffer size includes a first distance from the autonomous robotic system in one direction relative to an orientation of the autonomous robotic system and a second distance from the autonomous robotic system in another direction relative to the orientation of the autonomous robotic system, wherein the first distance and the second distance are different. Either the first distance or the second distance may be in a vertical direction above the autonomous robotic system.

In some examples, the system detects the trigger condition after the autonomous robotic system has slowed or ceased its movement in the scene. In some examples, the trigger condition includes a state in which the autonomous robotic system has stopped for more than a threshold period of time and in which the monitored action was not an action or state of a traffic control device. In some examples, in response to losing communication with the remote server, the system causes the autonomous robotic system to cease operating according to the remote guidance instructions. The system may, in response to receiving instructions from the remote server to cease operating according to the remote guidance instructions, cause the autonomous robotic system to cease operating according to the remote guidance instructions. In some examples, in response to operating according to the remote guidance instructions for a threshold period of time, the system may cause the autonomous robotic system to cease operating according to the remote guidance instructions.

In an embodiment, a non-transitory computer-readable medium includes instructions stored thereon that, when executed by at least one computing device, cause the at least one computing device to perform operations. The operations include, in response to monitoring one or more actions of one or more objects detected in a scene in which the autonomous robotic system is moving, causing the autonomous robotic system to slow or cease movement of the autonomous robotic system in the scene. The operations further include detecting a trigger condition based on movement of the autonomous robotic system in the scene and, in response to the one or more monitored actions and detecting the trigger condition, transmitting a remote guidance request to a remote server. The operations include, after transmitting the remote guidance request, receiving remote guidance instructions from the remote server and causing the autonomous robotic system to begin operating according to the remote guidance instructions.

DETAILED DESCRIPTION

Figure 1:
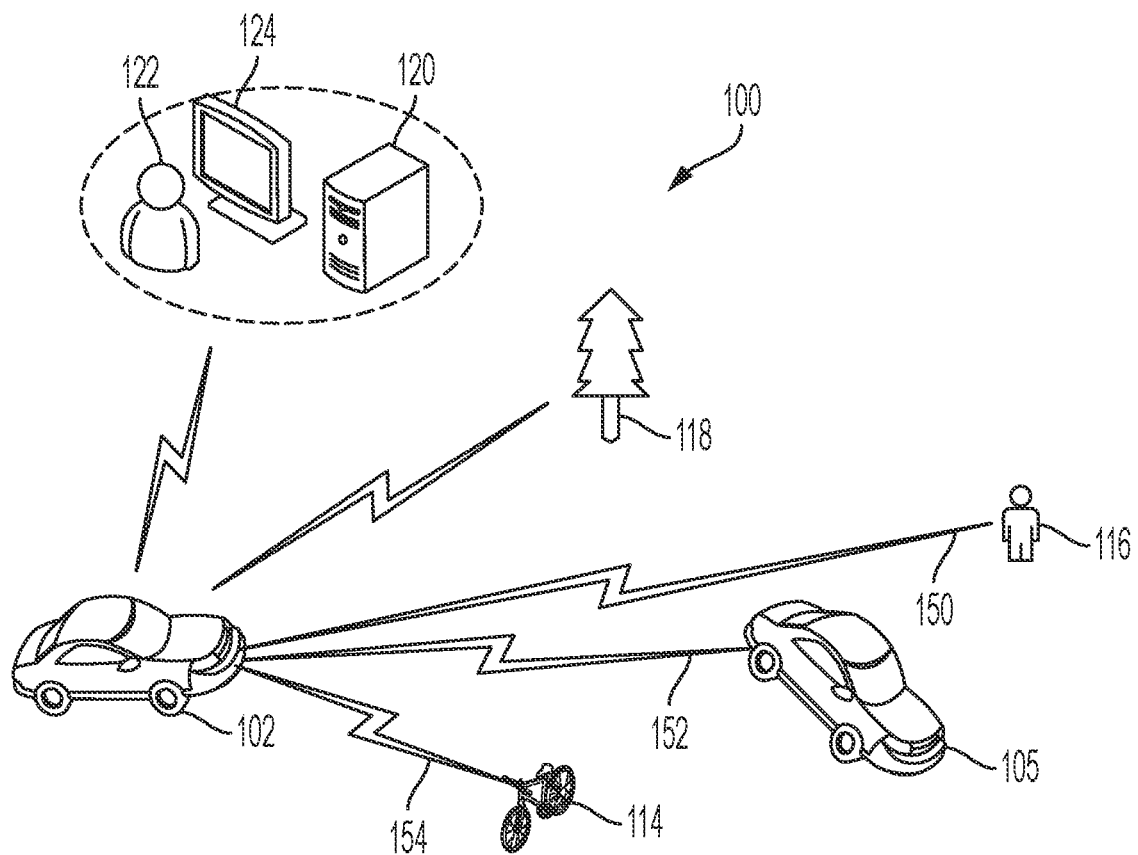
FIG. 1 illustrates an example environment of an autonomous vehicle.

As used in this document, the singular forms "a," "an," and "the" include plural references unless the context clearly dictates otherwise. Unless defined otherwise, all technical and scientific terms used herein have the same meanings as commonly understood by one of ordinary skill in the art. As used in this document, the term "comprising" (or "comprises") means "including (or includes), but not limited to." Definitions for additional terms that are relevant to this document are included at the end of this Detailed Description.

An autonomous robotic system must navigate a path through an environment with little or no human involvement and reach its destination reasonably quickly and carefully. The autonomous robotic system perceives stationary and moving objects in and around its path of travel, identifies and classifies the objects, forecasts actions and future positions of the objects, and takes appropriate action based on its programming or training. The autonomous robotic system may be programmed to follow specific rules, such as to come to a full stop for the duration of a red traffic light, or to maintain a minimum distance (buffer) between the robotic system and objects in the environment. The autonomous robotic system may also be trained, e.g., through machine-learning, to address a variety of real-world situations, such as how much to reduce speed when perception of the environment is compromised. However, the autonomous robotic system may find itself in a situation where it is unable to continue forward progress, e.g., due to the presence of nearby objects in the environment, or for other reasons.

For example, the robotic system may be unable to continue toward its destination while maintaining the required buffer between it and other objects. Or, the robotic system may be programmed to indefinitely yield the right of way to another object (e.g., a vehicle at a controlled intersection, or a pedestrian in a pedestrian walkway) as long as the other object remains stationary. Or the robotic system may encounter an unpredictable, novel situation which falls outside the parameters of its programming and training. In one extreme example, the robotic system may be in a crowded city or other environment, surrounded on all sides by pedestrians walking in a haphazard manner, e.g., not behaving in a manner consistent with the robotic system's training. A remote operator may be required to intervene, substituting the human experience of the remote operator for the programming and training of the robotic system, to extract the robotic system from the impasse so that the robotic system may proceed toward its destination.

Aspects of the present disclosure are directed to improving the ability of an autonomous robotic system to make forward progress after encountering an impasse, by detecting the condition and prompting a remote operator to temporarily invoke a non-standard operating mode. The non-standard operating mode increases the likelihood that the robotic system will overcome the impasse, while simultaneously implementing additional measures to help protect other actors in the environment while the non-standard operating mode is active. The non-standard operating mode may limit the speed of the robotic system to a low value while reducing the size of the physical buffers (i.e., distances that must be maintained) between the robotic system and objects in the environment. In this way, the robotic system may be able to make slow but steady advances to overcome the impasse.

Notably, the present solution is being described in the context of an autonomous vehicle. However, the present solution is not limited to autonomous vehicle applications. The present solution may be used in other applications such as robotic applications, radar system applications, metric applications, and/or system performance applications.

Referring now to FIG. 1, there is provided an illustration of an example system 100. System 100 comprises an autonomous vehicle (AV) 102 that is traveling through an environment in a semi-autonomous or autonomous manner. The AV 102 can include, but is not limited to, a land vehicle (as shown in FIG. 1), an aircraft, or a watercraft.

AV 102 is generally configured to detect objects 105, 114, 116, 118 in proximity thereto. The objects can include, but are not limited to, a vehicle 105, a cyclist 114 (such as a rider of a bicycle, electric scooter, motorcycle, or the like), a pedestrian 116, and/or stationary objects 118, such as a building, or a tree or other vegetation. This object detection can be made, for example, by analyzing sensor data generated by at least one sensor device on the AV 102 and/or information received from a communication device (e.g., a transceiver, a beacon and/or a smart phone) of the object via communication link(s) 150, 152, 154. The communication link(s) 150, 152, 154 can include, but are not limited to, V2X communication links. The term "V2X" refers to a communication between a vehicle and any entity that may affect, or may be affected by, the vehicle. The information can include, but is not limited to, information specifying actions or operations have been performed, being performed and/or are to be performed by the object.

When such a detection is made, the AV 102 performs operations to: generate one or more possible object trajectories for the detected object; determine one or more dynamic state classifications, goals and/or future intentions for the detection object; and use at least one of the generated possible object trajectories, dynamic state classifications, goals and future intentions to facilitate a determination of a vehicle trajectory. The AV 102 may then perform operations to follow the vehicle trajectory.

In some scenarios, the AV 102 performs additional operations to determine a probability that a conflict will occur between the AV 102 and the object in a threshold period of time (e.g., 1 minute). The conflict may be a collision, a condition where the AV 102 comes within less than a threshold distance from the object, or a condition that will cause the AV 102 to react with greater than a threshold deceleration or angular displacement in a period of time. If the probability exceeds a threshold level and/or satisfies one or more other conditions, the AV 102 performs operations to determine whether the collision can be avoided if the vehicle trajectory is followed by the AV 102 and any one of a plurality of dynamically generated emergency maneuvers is performed in a pre-defined time period (e.g., N milliseconds). If the conflict can be avoided, then the AV 102 takes no action or optionally performs a cautious maneuver (e.g., mildly slows down). In contrast, if the conflict cannot be avoided, then the AV 102 immediately takes an emergency maneuver (e.g., more forcefully applies the AV's brakes and/or changes the AV's direction of travel).

The AV 102 may be in communication via a communication link with a remote server 120 associated with a remote operator 122. The AV 102 may communicate with the remote server 120 through the Internet, a cellular network, or other communication link supporting continuous or near-continuous communication with the remote server 120. In some examples, the AV 102 communicates with the remote server 120 through a plurality of communication links, e.g., to provide greater reliability in the case of a communication failure related to one of the links, such as an inability to send or receive data. The remote operator 122 may be capable of taking over control and operation of the AV 102 through commands transmitted to the AV 102 by the remote server 120. The AV 102 may transmit perception data (e.g., from sensors of the AV 102) to the remote server 120 to assist the remote operator 122 while the remote operator 122 is controlling the AV 102. The perception data (disclosed in more detail in the following paragraphs) may be displayed on a screen 124 interfaced with the remote server 120. The remote server 120 may transmit commands to the AV 102, e.g., to control the speed and direction of the AV 102 according to the remote operator 122. For example, the remote operator 122 may control the AV 102 to proceed along an alternate trajectory. The remote operator 122 may also restore control to the AV 102, causing the AV 102 to operate according to its normal programming and training.

Figure 2:
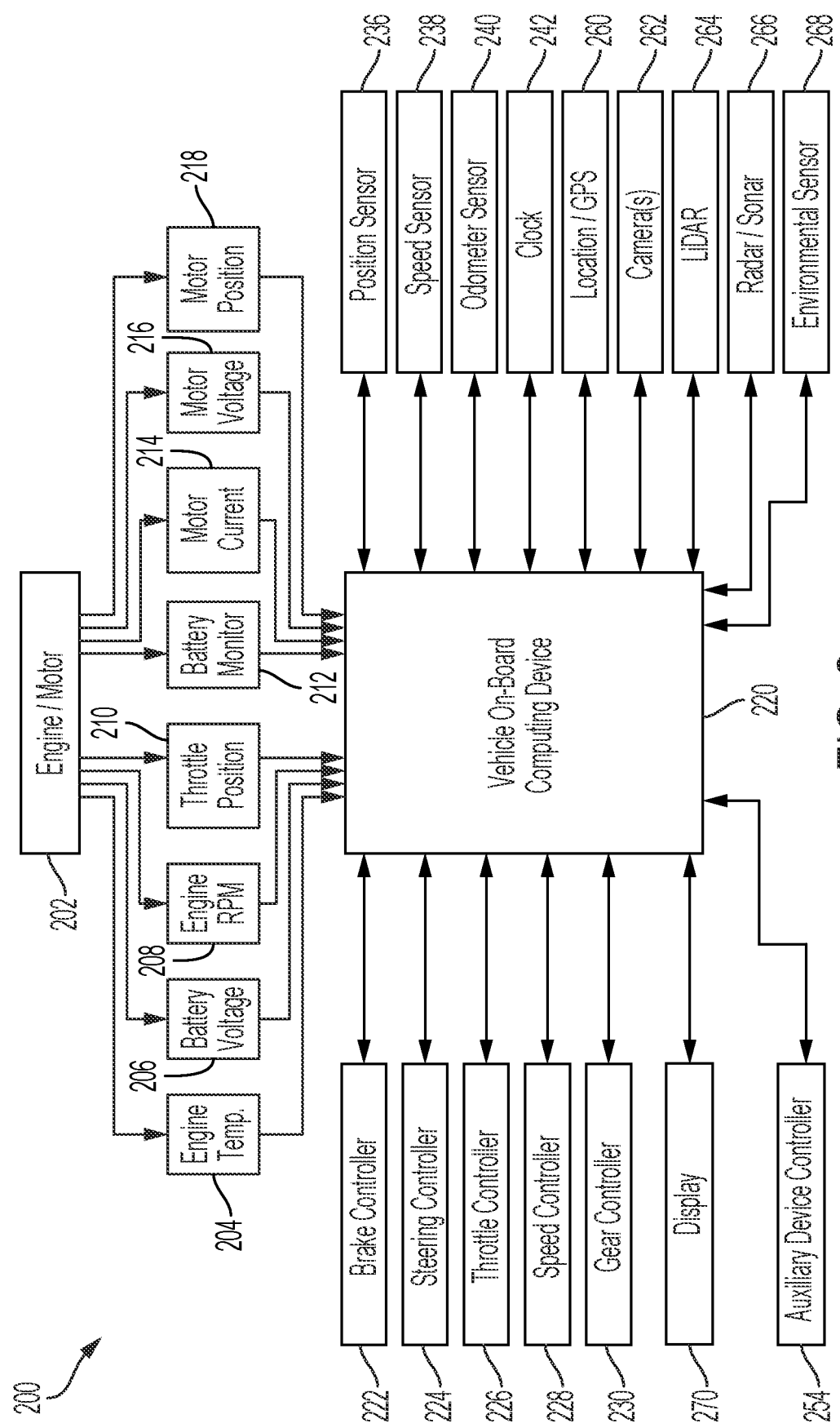
FIG. 2 illustrates example systems and components of an autonomous vehicle.

FIG. 2 illustrates an example system architecture 200 for a vehicle, such as an AV 102. The vehicle includes an engine or motor 202 and various sensors for measuring various parameters of the vehicle and/or its environment. Operational parameter sensors include, for example: a position sensor 236 such as an accelerometer, gyroscope and/or inertial measurement unit; a speed sensor 238; and an odometer sensor 240. The vehicle also may have a clock 242 that the system uses to determine vehicle time during operation. The clock 242 may be encoded into the vehicle on-board computing device, it may be a separate device, or multiple clocks may be available.

The vehicle also will include various sensors that operate to gather information about the environment in which the vehicle is traveling. These sensors may include, for example: a location sensor 260 such as a global positioning system (GPS) device; object detection sensors such as one or more cameras 262; a LiDAR sensor system 264; and/or a radar and or and/or a sonar system 266. The sensors also may include environmental sensors 268 such as: (a) a photosensor or other light sensor that can measure intensity of ambient light around the vehicle; (b) a rain sensor such as a sensor that projects infrared light into a windshield at an angle uses a measure of the amount of light that is reflected back to the sensor to measure an amount of precipitation that is on the windshield; and (c) an ambient temperature gauge or other type of temperature sensor. The object detection sensors may enable the vehicle to detect moving actors and stationary objects that are within a given distance range of the vehicle 102 in any direction, while the environmental sensors collect data about environmental conditions within the vehicle's area of travel. The system will also include one or more cameras 262 for capturing images of the environment. Any or all of these sensors will capture sensor data that will enable one or more processors of the vehicle's on-board computing device 220 and/or external devices to execute programming instructions that enable the computing system to classify objects in the perception data, and all such sensors, processors and instructions may be considered to be the vehicle's perception system. The vehicle also may receive state information, descriptive information or other information about devices or objects in its environment from a communication device (such as a transceiver, a beacon and/or a smart phone) via one or more wireless communication links, such as those known as vehicle-to-vehicle, vehicle-to-object or other V2X communication links.

During a run of the vehicle, information is communicated from the sensors to an on-board computing device 220. The on-board computing device 220 analyzes the data captured by the perception system sensors and, acting as a motion planning system, executes instructions to determine a trajectory for the vehicle. The trajectory includes pose and time parameters, and the vehicle's on-board computing device will control operations of various vehicle components to move the vehicle along the trajectory. For example, the on-board computing device 220 may control braking via a brake controller 222; direction via a steering controller 224; speed and acceleration via a throttle controller 226 (in a gas-powered vehicle) or a motor speed controller 228 (such as a current level controller in an electric vehicle); a differential gear controller 230 (in vehicles with transmissions); and/or other controllers.

Geographic location information may be communicated from the location sensor 260 to the on-board computing device 220, which may then access a map of the environment that corresponds to the location information to determine known fixed features of the environment such as streets, buildings, stop signs and/or stop/go signals. Captured images from the cameras 262 and/or object detection information captured from sensors such as a LiDAR system 264 is communicated from those sensors to the on-board computing device 220. The object detection information and/or captured images may be processed by the on-board computing device 220 to detect objects in proximity to the vehicle 102. Any known or to be known technique for performing object detection based on sensor data and/or captured images can be used in the embodiments disclosed in this document.

In addition, the AV may include an onboard display device 270 that may generate and output an interface on which sensor data, vehicle status information, or outputs generated by the processes described in this document are displayed to an occupant of the vehicle. The display device may include, or a separate device may be, an audio speaker that presents such information in audio format.

In the various embodiments discussed in this document, the description may state that the vehicle or on-board computing device of the vehicle may implement programming instructions that cause the on-board computing device of the vehicle to make decisions and use the decisions to control operations of one or more vehicle systems. However, the embodiments are not limited to this arrangement, as in various embodiments the analysis, decision-making and/or operational control may be handled in full or in part by other computing devices that are in electronic communication with the vehicle's on-board computing device. Examples of such other computing devices include an electronic device (such as a smartphone) associated with a person who is riding in the vehicle, as well as a remote server 120 that is in electronic communication with the vehicle via a communication network.

Figure 3:
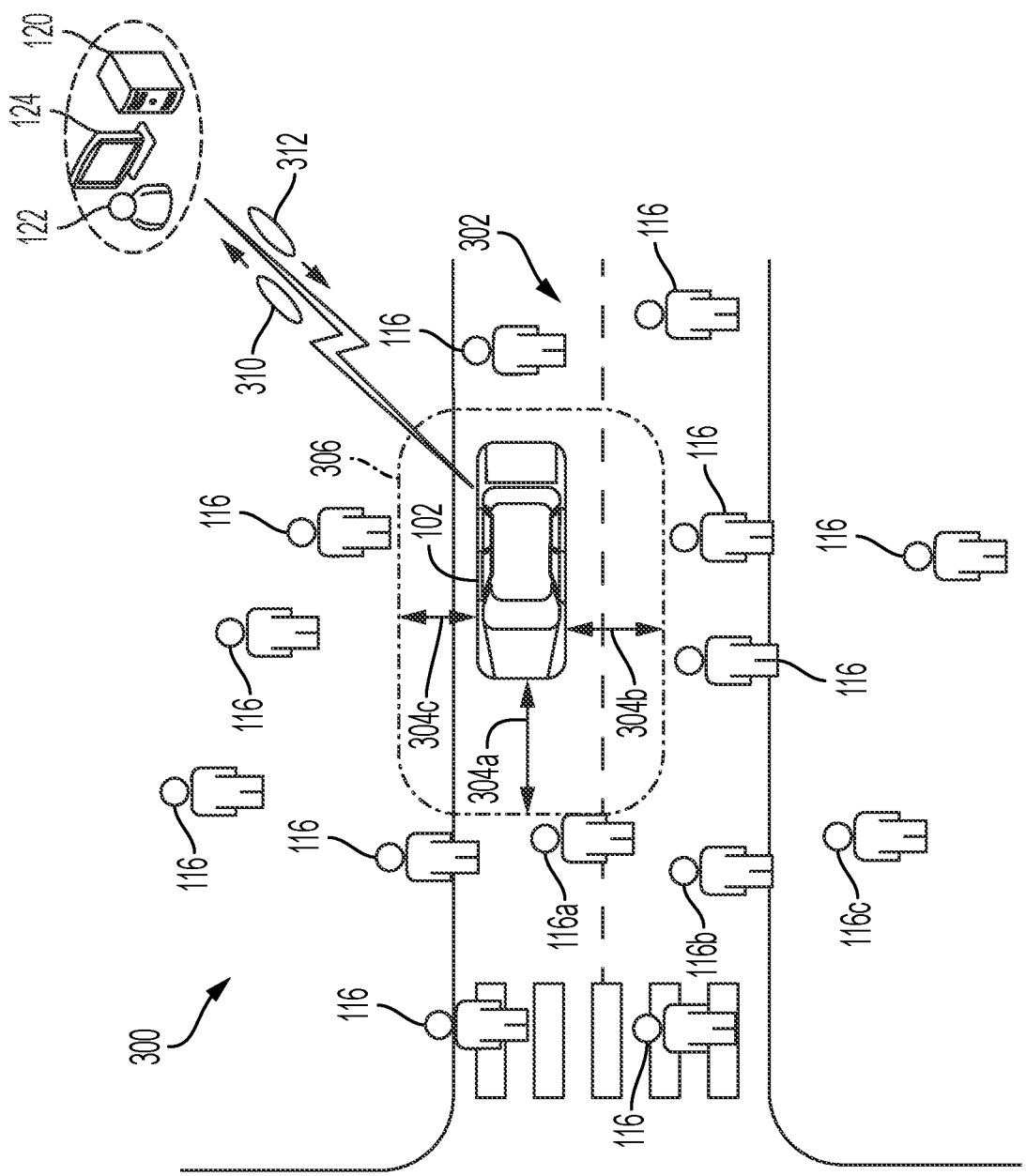
FIG. 3 illustrates an example scenario including an autonomous vehicle.

FIG. 3 show an example scenario 300 including an AV 102 travelling on a road 302 and surrounded on all sides by pedestrians 116 crossing the road 302. During this time period, the AV is moving according to locally generated guidance instructions, which are generated by the AV's motion planning system. The AV 102 may detect and monitor objects, such as the pedestrians 116 in proximity to the AV 102. The AV's 102 programming or training may cause the AV 102 to maintain a buffer distance 306 between the AV 102 and objects, such as pedestrians 116, perceived by the AV 102 (e.g., to avoid a conflict with the object). The buffer size 306 may be defined by distances, e.g., 304a, 304b, 304c from the vehicle in each of several directions. In some examples, buffer 306 includes a larger distance 304a in a direction generally along the trajectory of the AV 102, including small angles (e.g., less than 45 degrees) from the direction along the trajectory. The AV 102 may maintain smaller buffer distances 304b, 304c at large angles (e.g., between 45 and 135 degrees) from the trajectory of the AV 102. The buffer 306 may include a distance 304 above the AV 102, e.g., to avoid interacting with overhead objects, such as low bridges, low-hanging utility cables, or vegetation 118 such as tree branches. Here, the AV 102 perceives a pedestrian 116a at the edge of or within the area defined by the buffer 306. The AV's 102 programming or training may cause the AV 102 to slow or to stop when the pedestrian 116a (or other object) is within the buffer 306 area, e.g., in order to avoid a conflict with the pedestrian 116a. Once the AV 102 comes to a halt, other pedestrians (e.g., 116b, 116c) may feel emboldened to cross the street 302 even more closely to the AV 102 than the pedestrian 116a. As more and more pedestrians 116 cross the street within one or more of the buffers 306 of the AV 102, the AV 102 may be unable to continue along its trajectory according to its programming or training.

In some examples, the AV 102 is configured to detect that it has not made forward progress for a threshold period of time. The threshold time period may be more than 7 seconds when the AV 102 is not stopped due to a traffic signal or other event confirmed by the AV's 102 programming, such as being stopped behind an emergency vehicle, or other object with certain properties. The threshold time period may be longer, e.g., 45 or 60 seconds, under any circumstances (e.g., to account for a failed traffic signal). The threshold period of time may be adjusted, as experimental data is collected during operation of the AV 102. The lack of forward progress for the threshold period of time may trigger the AV 102 to transmit a request for assistance 310 to the remote server 120. In some examples, the AV 102 may anticipate a future lack of forward progress. The AV 102 may predict, e.g., based on perception data and/or environmental or other situational data, that the AV 102 will slow or stop at a future point in time. For example, the AV 102 may predict a trajectory of an object, such as a pedestrian or a bicyclist. The AV 102 may determine, based on the predicted trajectory of the object, that the object will encroach within a buffer 306 maintained by the AV 102 at a future moment in time. The encroaching object may cause the AV 102 to slow or stop forward progress in order to maintain the buffer 306. This predicted impediment to forward progress may also trigger the AV 102 to transmit a request for assistance 310 to the remote server 120. For example, based on continuously updated perception data related to the object, the AV 102 may continue to predict the object's trajectory and may continue to determine that the object will encroach within a buffer 306 maintained by the AV 102. The AV 102 may be configured to detect, based on the object's predicted trajectory, that it will slow or stop forward progress in less than a threshold period of time. Predicting that the AV 102 will slow or stop forward progress in less than the threshold period of time may trigger the AV 102 to transmit a request for assistance 310 to the remote server 120. In response to the request for assistance 310, the remote operator 122 may assess the situation (e.g., by reviewing the perception data transmitted from the AV 102 to the remote server 120). In some examples, the remote operator 122 determines that the AV 102 is, or will be, unable to proceed according to its programming and training, but the AV 102 may be able to advance under alternate programming. The remote operator 122 may cause the remote server 120 to transmit remote guidance instructions 312 to the AV 102, the remote guidance instructions 312 including alternate programming for the AV 102. In response to receiving the remote guidance instructions 312, the AV 102 may advance along its trajectory in accordance with the remote guidance instructions 312.

Figure 4:
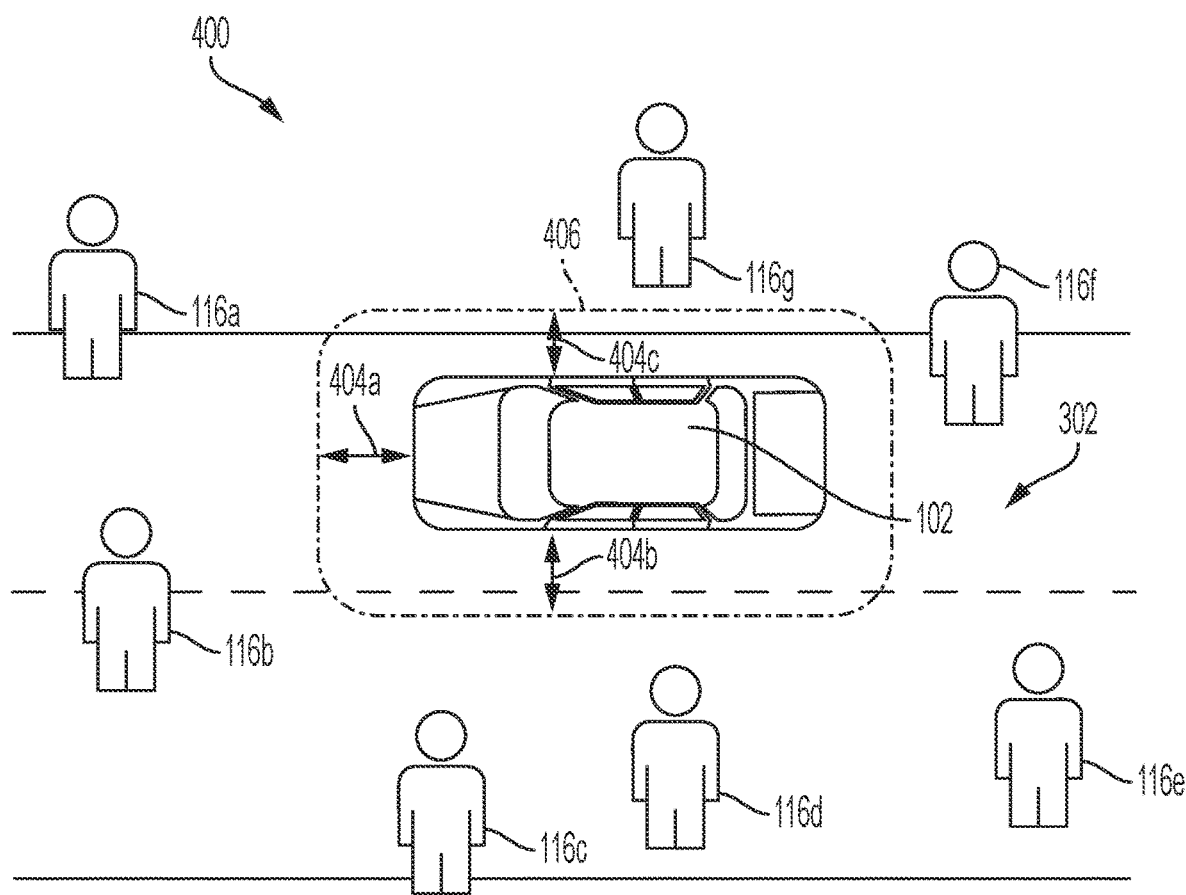
FIG. 4 illustrates the example scenario of FIG. 3 after the autonomous vehicle receives remote instructions.

FIG. 4 show an example scenario 400 similar to the example of FIG. 3. Here, the AV 102 has received remote guidance instructions 312. In some examples, the remote guidance instructions 312 limit the maximum allowable speed of the AV 102, such as a maximum speed of about 5 miles per hour (MPH), about 8 or 10 kilometers per hour (km/hr), or another suitable value. The remote guidance instructions 312 may include reduced distances 404a, 404b, 404c defining a smaller buffer 406, preferably reducing each of the previous distances 304 by approximately 50%. The AV 102 may perceive that there are no pedestrians 116 (or other objects) within the smaller buffer 406 defined by the reduced distances 404a, 404b, 404c of the remote guidance instructions 312. The AV 102 may be able to advance on its trajectory at the reduced maximum speed of the remote guidance instructions 312. As the AV 102 advances at the reduced speed of the remote guidance instructions 312, other pedestrians (e.g., 116b, 116c) may keep clear of the AV 102. The AV 102 may be able to continue on its trajectory according to the remote guidance instructions 312. In some examples, the AV 102 will validate the remote guidance instructions 312, or otherwise limit the scope of the remote guidance instructions 312. For example, the AV 102 may only accept remote guidance instructions 312 which affect buffer distances and maximum allowable speed of the AV 102, but otherwise do not override locally generated guidance instructions. Furthermore, the AV 102 may reject remote guidance instructions 312 which reduce buffer distances unless the remote guidance instructions 312 also reduce the maximum allowable speed of the AV 102. When operating under remote guidance instructions 312 in this way, the AV 102 continues to otherwise operate under locally generated instructions, e.g., detecting objects 105, 114, 116, 118 in proximity thereto, performing operations to generate possible object trajectories for the detected object, and determining a probability that a conflict will occur between the AV 102 and the object in a threshold period of time, as described above.

In some examples, the remote guidance instructions 312 include a limited time duration after which the AV 102 reverts to its previous programming and training. The limited time duration may be configurable by the remote operator 122. The remote guidance 312 may include instructions for the AV 102 to monitor the communication link with the remote server 120. If the AV 102 is unable to transmit or receive data via the communication link (and/or any redundant communication links), the instructions may cause the AV 102 to revert to its previous programming and training. For example, the remote server 120 may continually transmit keepalive messages to the AV 102. The AV 102 may operate according to the remote guidance instructions 312 only as long as the AV 102 continues to receive keepalive messages from the remote server 120 within a threshold time of receiving a previous keepalive message from the remote server 120. In this way, remote guidance instructions 312 are only effective while the remote operator 122 is able to oversee the AV 102 and intervene to take over control of the AV 102 or to cause the AV 102 to revert to its previous programming and training. The remote server 120 may transmit keepalive messages at 1 Hz or even more frequently based on the circumstances. In some examples, parameters of the remote guidance instructions 312, such as the maximum speed, buffer size, and limited time duration, are pre-installed in the AV 102, i.e., included in the programing of the AV 102, but normally inactive. The pre-installed remote guidance instructions 312 may be tested to ensure effectiveness of the parameters during training of the AV 102. The remote operator 122 may activate the pre-installed remote guidance instructions 312 atomically, e.g., to ensure that test tested parameters are activated simultaneously.

Figure 5:
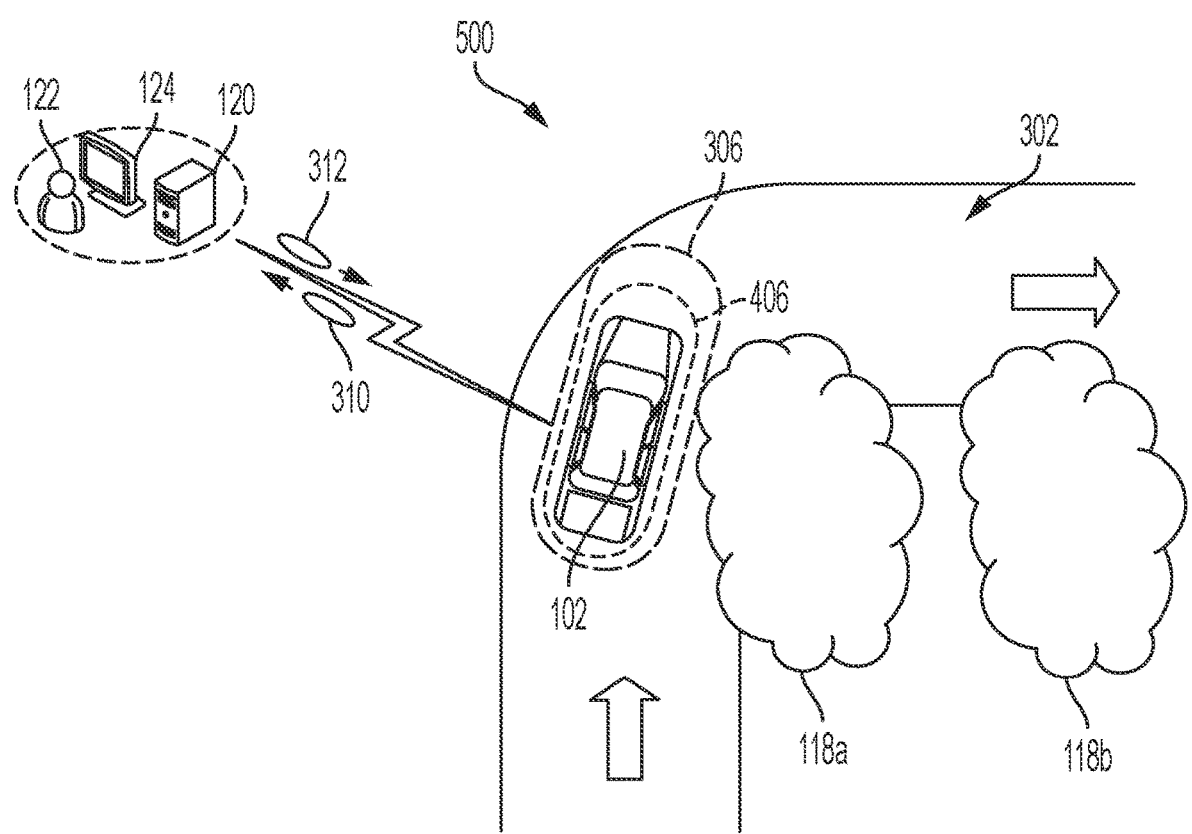
FIG. 5 illustrates another example scenario including the autonomous vehicle.

FIG. 5 shows an example scenario 500 including an AV 102 travelling on a one-way road 302 that includes a tight turn. Trees 118a, 118b line the sides of the road 302. As in the example scenario 300 of FIG. 3, the AV is moving according to locally generated guidance instructions, which are generated by the AV's motion planning system. Here, the AV's 102 programming or training may cause the AV 102 to slow or to stop when a tree 118a (or other object) is within the area defined by the buffer 306 above the AV 102, in order to avoid a conflict with, e.g., a low-hanging branch of the tree 118a. The AV 102 may be unable to continue along its trajectory according to its programming or training. As in the example scenario 300 of FIG. 3, the actual or predicted lack of forward progress for the threshold period may trigger the AV 102 to transmit a request for assistance 310 to the remote server 120. In response to the request for assistance 310, the remote operator 122 may cause the remote server 120 to transmit remote guidance instructions 312 to the AV 102. After the AV 102 advances under the remote guidance instructions 312 past the trees 118a, 118b, the remote operator 122 may cause the remote server 120 to transmit instructions to the AV 102 to continue under its previous programming and training. In some examples, the remote operator 122 configures the time duration of the remote guidance instructions 312 to be a relatively small value (e.g., one minute). The time duration may be sufficient for the AV 102 to pass the trees at the reduced speed, after which the AV 102 reverts to its previous programming and training. Other scenarios similar to the example scenario 400 of FIG. 4 include passing under a low overpass, such as a railroad bridge within the buffer 306 area above the AV 102. In response to a request 310 for remote assistance, the remote operator 122 may assess the situation (e.g., by reviewing the perception data transmitted from the AV 102 to the remote server 120) and determine that the AV 102 is able to advance under remote guidance 312 including a smaller buffer 406, defined by reduced distances 404 (e.g., reduced by 50%), and at a reduced speed.

Figure 6:
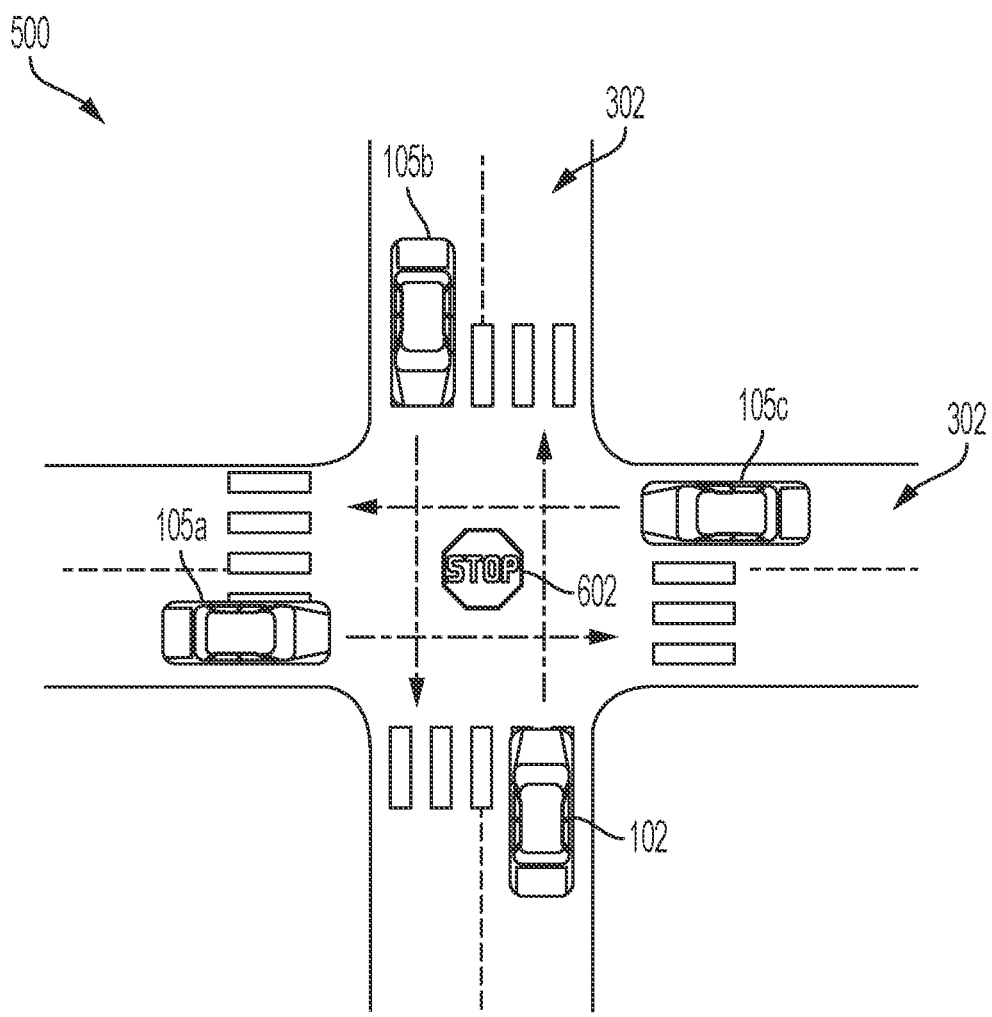
FIG. 6 illustrates another example scenario including the autonomous vehicle.

FIG. 6 shows an example scenario 500 including an AV 102 and other objects, including three vehicles 105a, 105b, 105c. Here, the AV 102 and the vehicles 105 are stopped at a four-way stop intersection 602. Each of the vehicles 102, 105 may be traveling on a trajectory across the intersection 602. The AV's 102 programming or training may cause the AV 102 to yield to the vehicle 105a to the left of the AV 102 in the intersection 602 (e.g., to avoid a conflict with the vehicle 105a). The vehicle 105a to the left of the AV 102 may yield to the vehicle 105b to its left, which may yield to the vehicle 105c to its left, which may yield to the AV 102. The AV 102 may detect that it has not made forward progress for a threshold period of time (or may predict a future lack of forward progress). The actual or predicted lack of forward progress for the threshold period may trigger the AV 102 to transmit a request 310 to the remote server 120 for remote guidance. As disclosed above, the remote operator 122 may cause the remote server 120 to transmit remote guidance instructions 312 to the AV 102. The AV 102 may perceive that the vehicle 105a to the left of the AV 102 is not within the reduced buffer distances 404a, 404b, 404c of the remote guidance instructions 312. The AV 102 may advance into the intersection 602 under the remote guidance instructions 312, at the reduced maximum speed, and may otherwise operate under locally generated instructions. As the AV 102 advances through the intersection, the vehicle 105a that was to the left of the AV 102 may be able to advance through the intersection, allowing the vehicle 105b to its left to advance through the intersection, and so forth, breaking the impasse for all the vehicles 102, 105. The remote guidance instructions 312 may be used to overcome the example impasse situations and other, novel situations detected by the AV 102 when the AV 102 is unable to make progress for a threshold period.

Figure 7:
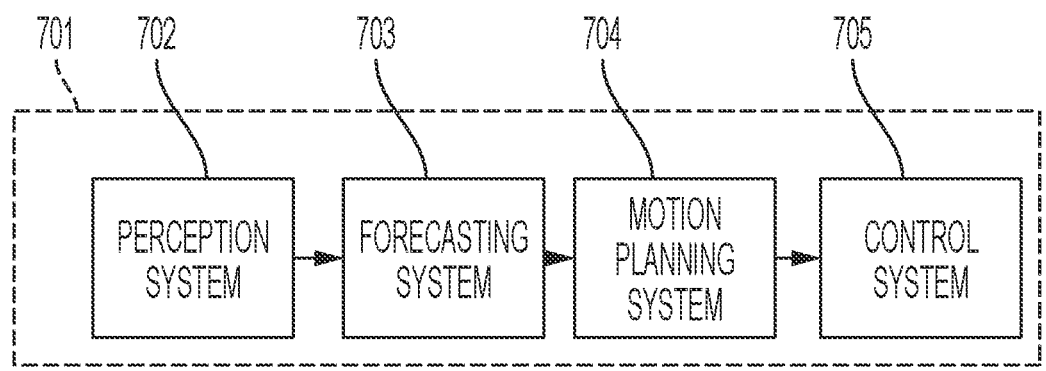
FIG. 7 illustrates a high-level overview of subsystems of an autonomous vehicle.

FIG. 7 shows a high-level overview 701 of vehicle subsystems that may be relevant to the discussion above. The subsystems may include a perception system 702 that includes sensors that capture information about moving actors and other objects that exist in the vehicle's immediate surroundings. Example sensors include cameras, LiDAR sensors and radar sensors. The data captured by such sensors (such as digital image, LiDAR point cloud data, or radar data) is known as perception data. The perception data may include data representative of one or more objects in the environment. The perception system may include one or more processors, along with a computer-readable memory with programming instructions and/or trained artificial intelligence models that, during a run of the vehicle, will process the perception data to identify objects and assign categorical labels and unique identifiers to each object detected in a scene. Categorical labels may include categories such as vehicle, bicyclist, pedestrian, building, and the like. Methods of identifying objects and assigning categorical labels to objects are well known in the art, and any suitable classification process may be used, such as those that make bounding box predictions for detected objects in a scene and use convolutional neural networks or other computer vision models. Some such processes are described in "Yurtsever et al., A Survey of Autonomous Driving: Common Practices and Emerging Technologies" (arXiv Apr. 2, 2020).

If the vehicle is an AV, the vehicle's perception system 702 may deliver perception data to the vehicle's forecasting system 703. The forecasting system (which also may be referred to as a prediction system) will include processors and computer-readable programming instructions that are configured to process data received from the perception system and forecast actions of other actors that the perception system detects.

In an AV, the vehicle's perception system, as well as the vehicle's forecasting system, will deliver data and information to the vehicle's motion planning system 704 and motion control system 705 so that the receiving systems may assess such data and initiate any number of reactive motions to such data. The motion planning system 704 and control system 705 include and/or share one or more processors and computer-readable programming instructions that are configured to process data received from the other systems, determine a trajectory for the vehicle, and output commands to vehicle hardware to move the vehicle according to the determined trajectory. Example actions that such commands may cause the vehicle hardware to take include causing the vehicle's brake control system to actuate, causing the vehicle's acceleration control subsystem to increase speed of the vehicle, or causing the vehicle's steering control subsystem to turn the vehicle. Various motion planning techniques are well known, for example as described in Gonzalez et al., "A Review of Motion Planning Techniques for Automated Vehicles," published in IEEE Transactions on Intelligent Transportation Systems, vol. 17, no. 4 (April 2016).

In non-AV embodiments, such as with vehicles that are driven by human operators, the motion planning system 704 may be embodied in processor hardware and computer-readable hardware that are part of an electronic devices that is contained with the vehicle, such as an dashboard navigation system or a mobile electronic device of the operator. In such situations, the electronic device may output the trajectories planned by the motion planning system via a display, an audio speaker, or both. In addition, some parts of the perception system 702 may include a transceiver of an electronic device that receives certain perception data (such as weather data) via wireless communication.

Figure 8:
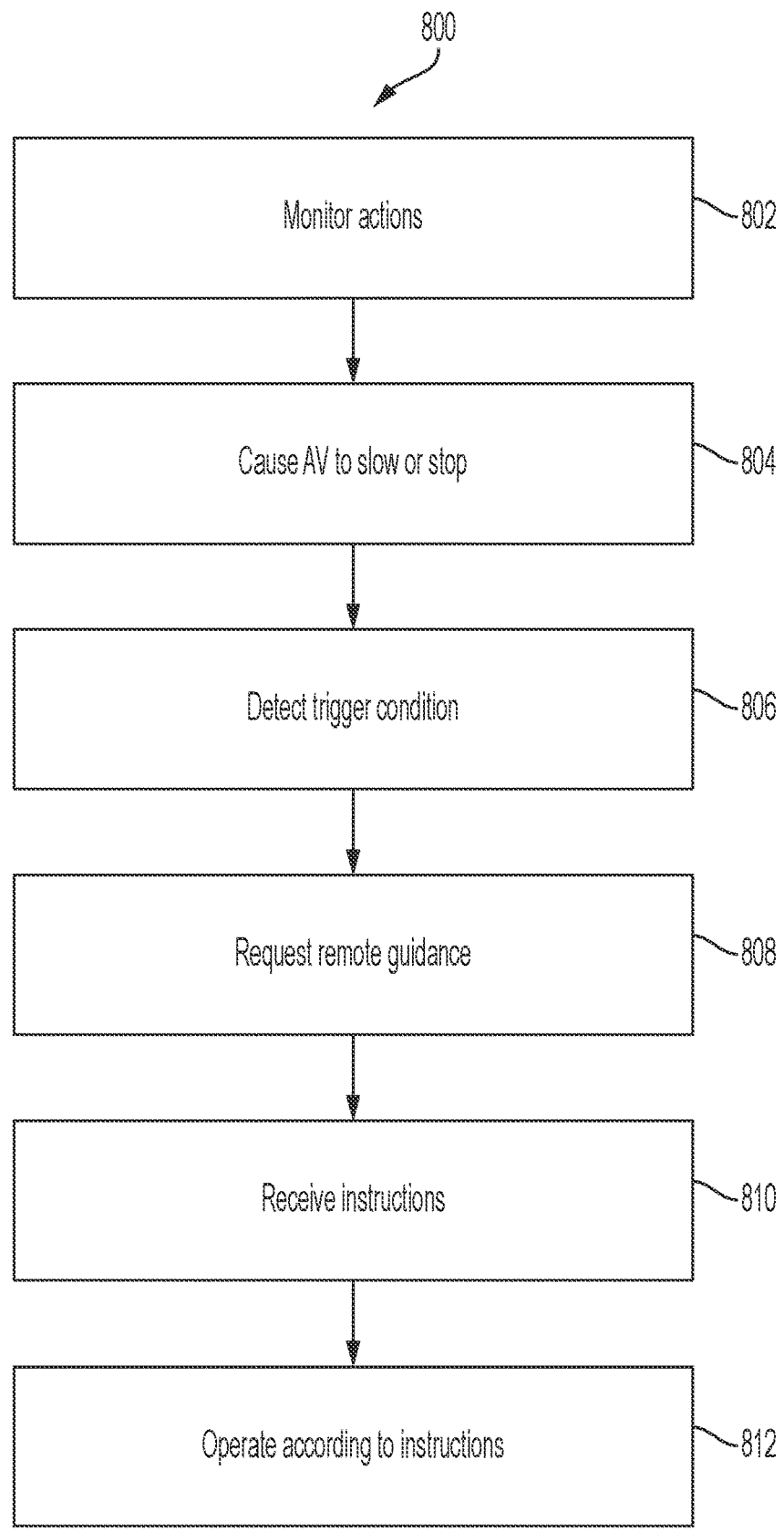
FIG. 8 is a flowchart of a method for guiding an autonomous robotic system.

FIG. 8 is a flowchart of a method 800 of guiding an autonomous robotic system. At step 802, the method 800 includes monitoring actions of one or more objects that a perception system of the autonomous robotic system has detected in a scene in which the autonomous robotic system is moving. At step 804, the method 800 includes, in response to one or more of the monitored actions, causing a motion control system of the autonomous robotic system to slow or cease movement of the autonomous robotic system in the scene. At step 806, the method 800 includes, after the autonomous robotic system has slowed or ceased its movement in the scene, detecting a trigger condition. The trigger condition may include a state in which the autonomous robotic system has stopped for more than a threshold period of time and in which the monitored action was not an action or state of a traffic control device. At step 808, the method 800 includes, in response to detecting the trigger condition, transmitting a remote guidance request to a remote server. At step 810, the method 800 includes, after transmitting the remote guidance request, receiving remote guidance instructions from the remote server. At step 812, the method 800 includes causing the motion control system of the autonomous robotic system to begin operating according to the remote guidance instructions. In some examples, operating according to the remote guidance instructions includes reducing a minimum allowable buffer size within which the autonomous robotic system may approach one or more of the objects, reducing a maximum allowable speed of the autonomous robotic system, causing the autonomous robotic system to move in the scene according to the minimum allowable buffer size and the maximum allowable speed and, after at least a threshold amount of time or distance, reverting the minimum allowable buffer size and the maximum allowable speed to previous values. Reducing the minimum allowable buffer size may include reducing the minimum allowable buffer size by approximately 50%. In some examples, the method 800 further includes transmitting perception data to the remote server while operating according to the remote guidance instructions. The method 800 may include, in response to losing communication with the remote server, causing the motion control system of the autonomous robotic system to cease operating according to the remote guidance instructions. The method 800 may include, in response to losing communication with the remote server, causing the motion control system of the autonomous robotic system to cease operating according to the remote guidance instructions. The method 800 may include, in response to receiving instructions from the remote server to cease operating according to the remote guidance instructions, causing the motion control system of the autonomous robotic system to cease operating according to the remote guidance instructions. The method 800 may include, in response to operating according to the remote guidance instructions for a threshold period of time, causing the motion control system of the autonomous robotic system to cease operating according to the remote guidance instructions.

Figure 9:
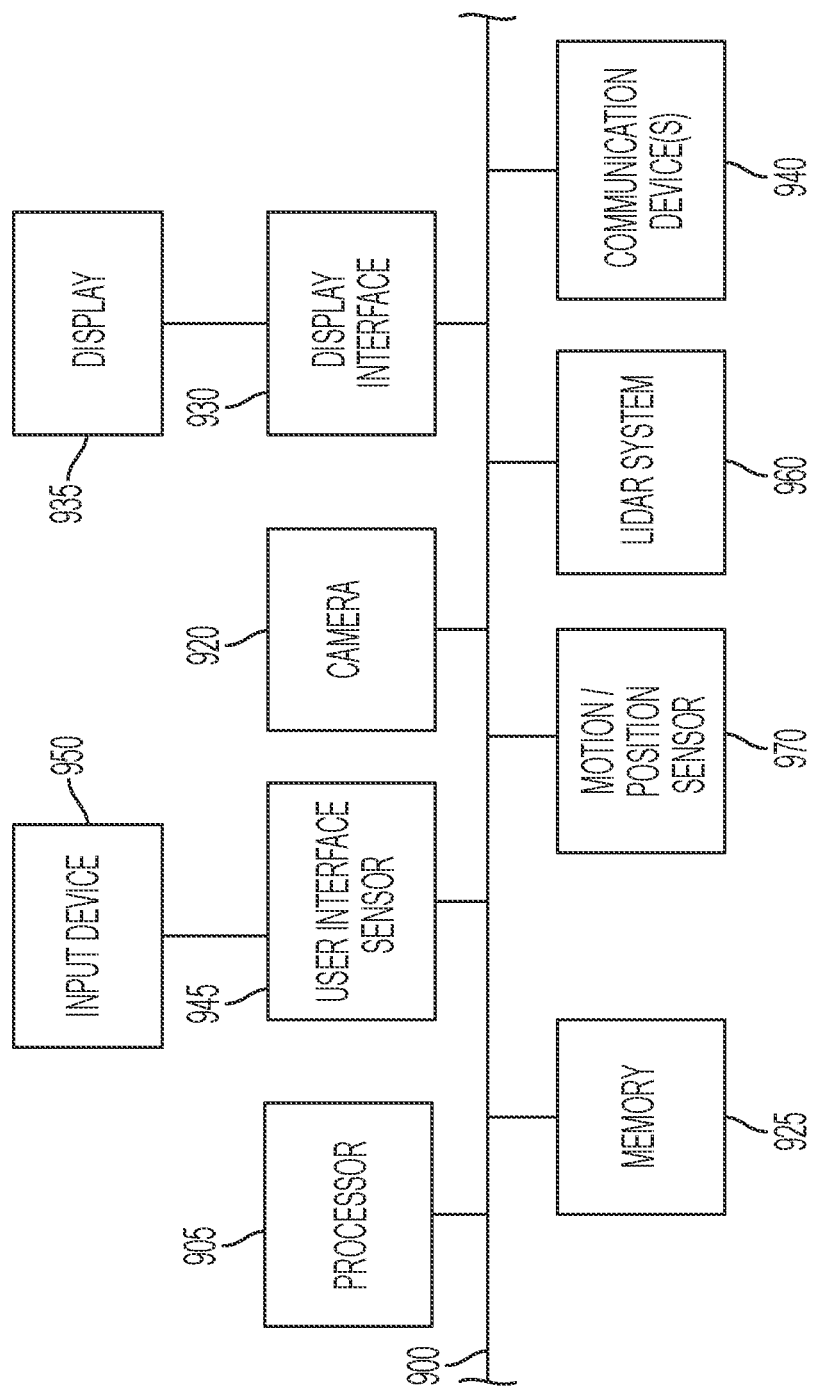
FIG. 9 is a block diagram that illustrates various elements of a possible electronic subsystem of an AV and/or external electronic device.

FIG. 9 depicts an example of internal hardware that may be included in any of the electronic components of the system, such as internal processing systems of the AV, external monitoring and reporting systems, or remote servers. An electrical bus 900 serves as an information highway interconnecting the other illustrated components of the hardware. Processor 905 is a central processing device of the system, configured to perform calculations and logic operations required to execute programming instructions. As used in this document and in the claims, the terms "processor" and "processing device" may refer to a single processor or any number of processors in a set of processors that collectively perform a set of operations, such as a central processing unit (CPU), a graphics processing unit (GPU), a remote server, or a combination of these. Read only memory (ROM), random access memory (RAM), flash memory, hard drives and other devices capable of storing electronic data constitute examples of memory devices 925. A memory device may include a single device or a collection of devices across which data and/or instructions are stored. Various embodiments may include a computer-readable medium containing programming instructions that are configured to cause one or more processors to perform the functions described in the context of the previous figures.

An optional display interface 930 may permit information from the bus 900 to be displayed on a display device 935 in visual, graphic or alphanumeric format, such as an in-dashboard display system of the vehicle. An audio interface and audio output (such as a speaker) also may be provided. Communication with external devices may occur using various communication devices 940 such as a wireless antenna, a radio frequency identification (RFID) tag and/or short-range or near-field communication transceiver, each of which may optionally communicatively connect with other components of the device via one or more communication system. The communication device(s) 940 may be configured to be communicatively connected to a communications network, such as the Internet, a local area network or a cellular telephone data network.

The hardware may also include a user interface sensor 945 that allows for receipt of data from input devices 950 such as a keyboard or keypad, a joystick, a touchscreen, a touch pad, a remote control, a pointing device and/or microphone. Digital image frames also may be received from a camera 920 that can capture video and/or still images. The system also may receive data from a motion and/or position sensor 970 such as an accelerometer, gyroscope or inertial measurement unit. The system also may include and receive data via a LiDAR system 960, when used in the context of autonomous vehicles.

The above-disclosed features and functions, as well as alternatives, may be combined into many other different systems or applications. Various components may be implemented in hardware or software or embedded software. Various presently unforeseen or unanticipated alternatives, modifications, variations or improvements may be made by those skilled in the art, each of which is also intended to be encompassed by the disclosed embodiments.

Terminology that is relevant to the disclosure provided above includes:

An "autonomous robotic system" or "robotic device" refers to an electronic device that includes a processor, programming instructions, and one or more physical hardware components that, in response to commands from the processor, can move with minimal or no human intervention. Through such movement, a robotic device may perform one or more automatic functions or function sets. Examples of such operations, functions or tasks may include, without limitation, operating wheels or propellers to effectuate driving, flying or other transportation actions, operating robotic lifts for loading, unloading, medical-related processes, construction-related processes, and/or the like. Example robotic devices may include, without limitation, autonomous vehicles, drones and other autonomous robotic devices.

The term "vehicle" refers to any moving form of conveyance that is capable of carrying either one or more human occupants and/or cargo and is powered by any form of energy. The term "vehicle" includes, but is not limited to, cars, trucks, vans, trains, autonomous vehicles, aircraft, aerial drones and the like. An "autonomous vehicle" is a vehicle having a processor, programming instructions and drivetrain components that are controllable by the processor without requiring a human operator. An autonomous vehicle may be fully autonomous in that it does not require a human operator for most or all driving conditions and functions. Alternatively, it may be semi-autonomous in that a human operator may be required in certain conditions or for certain operations, or that a human operator may override the vehicle's autonomous system and may take control of the vehicle. Autonomous vehicles also include vehicles in which autonomous systems augment human operation of the vehicle, such as vehicles with driver-assisted steering, speed control, braking, parking and other advanced driver assistance systems.

The term "object," when referring to an object that is detected by a vehicle perception system or simulated by a simulation system, is intended to encompass both stationary objects and moving (or potentially moving) actors, except where specifically stated otherwise by use of the term "actor" or "stationary object."

When used in the context of autonomous vehicle motion planning, the term "trajectory" refers to the plan that the vehicle's motion planning system will generate, and which the vehicle's motion control system will follow when controlling the vehicle's motion. A trajectory includes the vehicle's planned position and orientation at multiple points in time over a time horizon, as well as the vehicle's planned steering wheel angle and angle rate over the same time horizon. The trajectory may also include the planned velocity and acceleration at some or all of these points in time. An autonomous vehicle's motion control system will consume the trajectory and send commands to the vehicle's steering controller, brake controller, throttle controller and/or other motion control subsystem to move the vehicle along a planned path.

A "trajectory" of an actor that a vehicle's perception or prediction systems may generate refers to the predicted path that the actor will follow over a time horizon, along with the predicted speed of the actor and/or position of the actor along the path at various points along the time horizon.

In this document, the terms "street," "lane," "road" and "intersection" are illustrated by way of example with vehicles traveling on one or more roads. However, the embodiments are intended to include lanes and intersections in other locations, such as parking areas. In addition, for autonomous vehicles that are designed to be used indoors (such as automated picking devices in warehouses), a street may be a corridor of the warehouse and a lane may be a portion of the corridor. If the autonomous vehicle is a drone or other aircraft, the term "street" or "road" may represent an airway and a lane may be a portion of the airway. If the autonomous vehicle is a watercraft, then the term "street" or "road" may represent a waterway and a lane may be a portion of the waterway.

An "electronic device" or a "computing device" refers to a device that includes a processor and memory. Each device may have its own processor and/or memory, or the processor and/or memory may be shared with other devices as in a virtual machine or container arrangement. The memory will contain or receive programming instructions that, when executed by the processor, cause the electronic device to perform one or more operations according to the programming instructions.

The terms "memory," "memory device," "computer-readable medium," "data store," "data storage facility" and the like each refer to a non-transitory device on which computer-readable data, programming instructions or both are stored. Except where specifically stated otherwise, the terms "memory," "memory device," "computer-readable medium," "data store," "data storage facility" and the like are intended to include single device embodiments, embodiments in which multiple memory devices together or collectively store a set of data or instructions, as well as individual sectors within such devices. A computer program product is a memory device with programming instructions stored on it.

The terms "processor" and "processing device" refer to a hardware component of an electronic device that is configured to execute programming instructions, such as a microprocessor or other logical circuit. A processor and memory may be elements of a microcontroller, custom configurable integrated circuit, programmable system-on-a-chip, or other electronic device that can be programmed to perform various functions. Except where specifically stated otherwise, the singular term "processor" or "processing device" is intended to include both single-processing device embodiments and embodiments in which multiple processing devices together or collectively perform a process.

In this document, the terms "communication link" and "communication path" mean a wired or wireless path via which a first device sends communication signals to and/or receives communication signals from one or more other devices. Devices are "communicatively connected" if the devices are able to send and/or receive data via a communication link. "Electronic communication" refers to the transmission of data via one or more signals between two or more electronic devices, whether through a wired or wireless network, and whether directly or indirectly via one or more intermediary devices.

A "machine learning model" or a "model" refers to a set of algorithmic routines and parameters that can predict an output(s) of a real-world process (e.g., prediction of an object trajectory, a suitable recommendation based on a user search query, etc.) based on a set of input features, without being explicitly programmed. A structure of the software routines (e.g., number of subroutines and relation between them) and/or the values of the parameters can be determined in a training process, which can use actual results of the real-world process that is being modeled. Such systems or models are understood to be necessarily rooted in computer technology, and in fact, cannot be implemented or even exist in the absence of computing technology. While machine learning systems utilize various types of statistical analyses, machine learning systems are distinguished from statistical analyses by virtue of the ability to learn without explicit programming and being rooted in computer technology.

In this document, the terms "about" and "approximately", when used to modify a value, indicate a range that includes +/−10% from that value.

References in this document to "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein.

In this document, when relative terms of order such as "first" and "second" are used to modify a noun, such use is simply intended to distinguish one item from another, and is not intended to require a sequential order unless specifically stated.

In addition, terms of relative position such as "vertical" and "horizontal", or "front" and "rear", when used, are intended to be relative to each other and need not be absolute, and only refer to one possible position of the device associated with those terms depending on the device's orientation. When this document uses the terms "front," "rear," and "sides" to refer to an area of a vehicle, they refer to areas of vehicle with respect to the vehicle's default area of travel. For example, a "front" of an automobile is an area that is closer to the vehicle's headlamps than it is to the vehicle's tail lights, while the "rear" of an automobile is an area that is closer to the vehicle's tail lights than it is to the vehicle's headlamps. In addition, the terms "front" and "rear" are not necessarily limited to forward-facing or rear-facing areas but also include side areas that are closer to the front than the rear, or vice versa, respectively. "Sides" of a vehicle are intended to refer to side-facing sections that are between the foremost and rearmost portions of the vehicle.

The invention claimed is:

1. A method of guiding an autonomous robotic system, the method comprising, by a processor:
  monitoring one or more actions of one or more objects detected in a scene in which the autonomous robotic system is moving to predict trajectories of the one or more objects;
  in response to a trajectory of at least one detected object predicted to cause the autonomous robotic system to slow or cease movement at a future point in time, transmitting a remote guidance request to a remote server;
  after transmitting the remote guidance request, receiving remote guidance instructions from the remote server; and
  causing the autonomous robotic system to begin operating according to the remote guidance instructions, wherein operating according to the remote guidance instructions comprises:
    reducing a minimum allowable buffer size within which the autonomous robotic system may approach one or more of the objects,
    reducing a maximum allowable speed of the autonomous robotic system,
    causing the autonomous robotic system to move in the scene according to the minimum allowable buffer size and the maximum allowable speed while receiving a plurality of keepalive messages from the remote server, and
    in response to not receiving an expected keepalive message, reverting the minimum allowable buffer size and the maximum allowable speed to previous values.

2. The method of claim 1, wherein operating according to the remote guidance instructions comprises:
- reducing a minimum allowable buffer size within which the autonomous robotic system may approach one or more of the objects;
- reducing a maximum allowable speed of the autonomous robotic system;
- causing the autonomous robotic system to move in the scene according to the minimum allowable buffer size and the maximum allowable speed; and
- after at least a threshold amount of time or distance, reverting the minimum allowable buffer size and the maximum allowable speed to previous values.

3. The method of claim 2, wherein reducing the minimum allowable buffer size comprises reducing the minimum allowable buffer size by approximately 50%.

4. The method of claim 2, wherein the minimum allowable buffer size includes a first distance from the autonomous robotic system in one direction relative to an orientation of the autonomous robotic system and a second distance from the autonomous robotic system in another direction relative to the orientation of the autonomous robotic system, wherein the first distance and the second distance are different.

5. The method of claim 1, further comprising, in response to losing communication with the remote server, causing the autonomous robotic system to cease operating according to the remote guidance instructions.

6. The method of claim 1, further comprising, in response to receiving instructions from the remote server to cease operating according to the remote guidance instructions, causing the autonomous robotic system to cease operating according to the remote guidance instructions.

7. The method of claim 1, further comprising, in response to operating according to the remote guidance instructions for a threshold period of time, causing the autonomous robotic system to cease operating according to the remote guidance instructions.

8. The method of claim 1, further comprising transmitting perception data to the remote server while operating according to the remote guidance instructions.

9. An autonomous robotic system comprising:
- a processor; and
- a memory that stores programming instructions that are configured to cause the processor to guide the autonomous robotic system by:
  - monitoring one or more actions of one or more objects detected in a scene in which the autonomous robotic system is moving to predict trajectories of the one or more objects;
  - in response to a trajectory of at least one detected object predicted to cause the autonomous robotic system to slow or cease movement at a future point in time, transmitting a remote guidance request to a remote server;
  - after transmitting the remote guidance request, receiving remote guidance instructions from the remote server; and
  - causing the autonomous robotic system to begin operating according to the remote guidance instructions, wherein operating according to the remote guidance instructions comprises:
    - reducing a minimum allowable buffer size within which the autonomous robotic system may approach one or more of the objects,
    - reducing a maximum allowable speed of the autonomous robotic system,
    - causing the autonomous robotic system to move in the scene according to the minimum allowable buffer size and the maximum allowable speed while receiving a plurality of keepalive messages from the remote server, and
    - in response to not receiving an expected keepalive message, reverting the minimum allowable buffer size and the maximum allowable speed to previous values.

10. The autonomous robotic system of claim 9, wherein the programming instructions are further configured to cause the processor to guide the autonomous robotic system by:
- reducing a minimum allowable buffer size within which the autonomous robotic system may approach one or more of the objects;
- reducing a maximum allowable speed of the autonomous robotic system;
- causing the autonomous robotic system to move in the scene according to the minimum allowable buffer size and the maximum allowable speed; and
- after at least a threshold amount of time or distance, reverting the minimum allowable buffer size and the maximum allowable speed to previous values.

11. The autonomous robotic system of claim 10, wherein reducing the minimum allowable buffer size comprises reducing the minimum allowable buffer size by approximately 50%.

12. The autonomous robotic system of claim 10, wherein the minimum allowable buffer size includes a first distance from the autonomous robotic system in one direction relative to an orientation of the autonomous robotic system and a second distance from the autonomous robotic system in another direction relative to the orientation of the autonomous robotic system, wherein the first distance and the second distance are different.

13. The autonomous robotic system of claim 9, wherein the programming instructions are further configured to cause the processor to guide the autonomous robotic system by, in response to losing communication with the remote server, causing the autonomous robotic system to cease operating according to the remote guidance instructions.

14. The autonomous robotic system of claim 9, wherein the programming instructions are further configured to cause the processor to guide the autonomous robotic system by, in response to receiving instructions from the remote server to cease operating according to the remote guidance instructions, causing the autonomous robotic system to cease operating according to the remote guidance instructions.

15. The autonomous robotic system of claim 9, wherein the programming instructions are further configured to cause the processor to guide the autonomous robotic system by, in response to operating according to the remote guidance instructions for a threshold period of time, causing the autonomous robotic system to cease operating according to the remote guidance instructions.

16. A non-transitory computer-readable medium having instructions stored thereon that, when executed by at least one computing device, cause the at least one computing device to perform operations comprising:
- monitoring one or more actions of one or more objects detected in a scene in which an autonomous robotic system is moving, to predict trajectories of the one or more objects;
- in response to a trajectory of at least one detected object predicted to cause the autonomous robotic system to slow or cease movement at a future point in time, transmitting a remote guidance request to a remote server;

after transmitting the remote guidance request, receiving remote guidance instructions from the remote server; and causing the autonomous robotic system to begin operating according to the remote guidance instructions, wherein operating according to the remote guidance instructions comprises:

reducing a minimum allowable buffer size within which the autonomous robotic system may approach one or more of the objects, reducing a maximum allowable speed of the autonomous robotic system, causing the autonomous robotic system to move in the scene according to the minimum allowable buffer size and the maximum allowable speed while receiving a plurality of keepalive messages from the remote server, and in response to not receiving an expected keepalive message, reverting the minimum allowable buffer size and the maximum allowable speed to previous values.

17. The method of claim 1, wherein causing the autonomous robotic system to begin operating according to the remote guidance instructions comprises causing the autonomous robotic system to begin operating with no human intervention.

18. The autonomous robotic system of claim 9, wherein the programming instructions configured to cause the processor to guide the autonomous robotic system by causing the autonomous robotic system to begin operating according to the remote guidance instructions comprise programming instructions configured to cause the processor to guide the autonomous robotic system by causing the autonomous robotic system to begin operating according to the remote guidance instructions with no human intervention.

\* \* \* \* \*